Inventor
Albert Doebeli
By Michael S. Striker
agt.

Patented Nov. 10, 1953

2,658,593

UNITED STATES PATENT OFFICE 2,658,593

ELECTROMAGNETICALLY ACTUATED MECHANICAL DOUBLE-FRICTION COUPLING

Albert Doebeli, Le Locle, Switzerland

Application September 21, 1949, Serial No. 117,047

Claims priority, application Switzerland September 23, 1948

9 Claims. (Cl. 192—48)

1

In connection with electro-magnetically actuated mechanical disc-shaped or laminated friction couplings it has already been proposed to produce the pressure for the friction surfaces by causing rolling bodies to roll up inclined surfaces or conical recesses between two actuating bodies. In order that the rolling bodies shall roll up and that the actuating body which is formed as a pressure body shall press the friction surfaces together by a wedging action, a relative turning motion between the two actuating bodies is necessary. For bringing about this relative turning motion between the actuating bodies associated with one coupling half, the actuating body which functions as engaging and disengaging member and as armature is, at the start of the operation preliminarily electro-magnetically coupled with the other coupling half which is provided with an electro-magnet. The frictional force the preliminary coupling with the radius R is transmitted to the inclined surfaces and rolling bodies distributed uniformly at the periphery, or to the conical recesses with interposed balls along the smaller radius R', causing the rolling bodies to roll up the inclined surfaces and the pressure body which is freely movable only in the axial direction to press the coupling discs together with a wedging action.

Such couplings operate entirely satisfactorily, but have certain disadvantages in the case of double friction couplings.

For double friction couplings which are to bring about a reversal of the direction of rotation in the case of reversing gears or of reversable machine tools and the like and have the double function of a driving coupling and of a coupling brake, it is of great advantage and preferable for both couplings to be adapted to be actuated by a common engaging and disengaging member.

With the known constructions of such couplings the double couplings referred to could be constructed with a common engaging and disengaging member, only if the pressure bodies for the friction surfaces are provided with correspondingly arranged unilaterally ascending inclined surfaces, and if the common engaging and disengaging member is provided on both sides with conical rollers guided by means of shafts in the armature, the inclined surfaces of the pressure body with the conical rollers of one coupling being displaced with respect to the inclined surfaces of the pressure body with the conical rollers of the other couplings.

Such a construction of the double couplings for

2 reversing gears or for forward and reverse running of machine tool art or for double couplings for driving and braking are costly to manufacture and have the further disadvantage, that, for instance for double couplings consisting of driving and braking coupling and so forth, a reversal of the direction of rotation is not possible without changing the pressure bodies having unilaterally ascending inclined surfaces. The provision of standard types and the manufacture of a series of such double couplings is rendered more difficult and costly.

According to the invention an electro-magnetically actuated double friction coupling, in which both couplings can be selectively put into and out of operation or in which it is possible to change over from coupling to coupling in the shortest time while only a single armature is used, is rendered possible by the arrangement of the armature between two pressure bodies. The armature and pressure bodies have conical recesses, and are connected with one another by means of balls which lie in the conical recesses between the pressure bodies and the armature, and by means of compression springs. The conical recesses of one coupling are so arranged with respect to the conical recesses of the other coupling that, as one coupling is put in operation, the produced frictional force between magnet and armature of the preliminary coupling causes the movably arranged conical recesses to turn relatively to each other, so that the balls will roll up in the conical recesses, and the pressure body will press the frictional surfaces of this coupling against one another with a wedging effect, while the conical recesses with the interposed balls of the other coupling remain mobile and do not come to bear, so that the balls cannot roll up and the pressure body of this coupling does not become effective.

The accompanying drawings illustrate preferred embodiments of the present invention.

Figure 1a and Figure 1b shows details of the embodiments according to Figures 1 and 4.

Figure 4a and Figure 4b shows details of the embodiments according to Figures 1 and 4, Fig. 4b being a section on line E—F in Fig. 4a.

Figure 1:
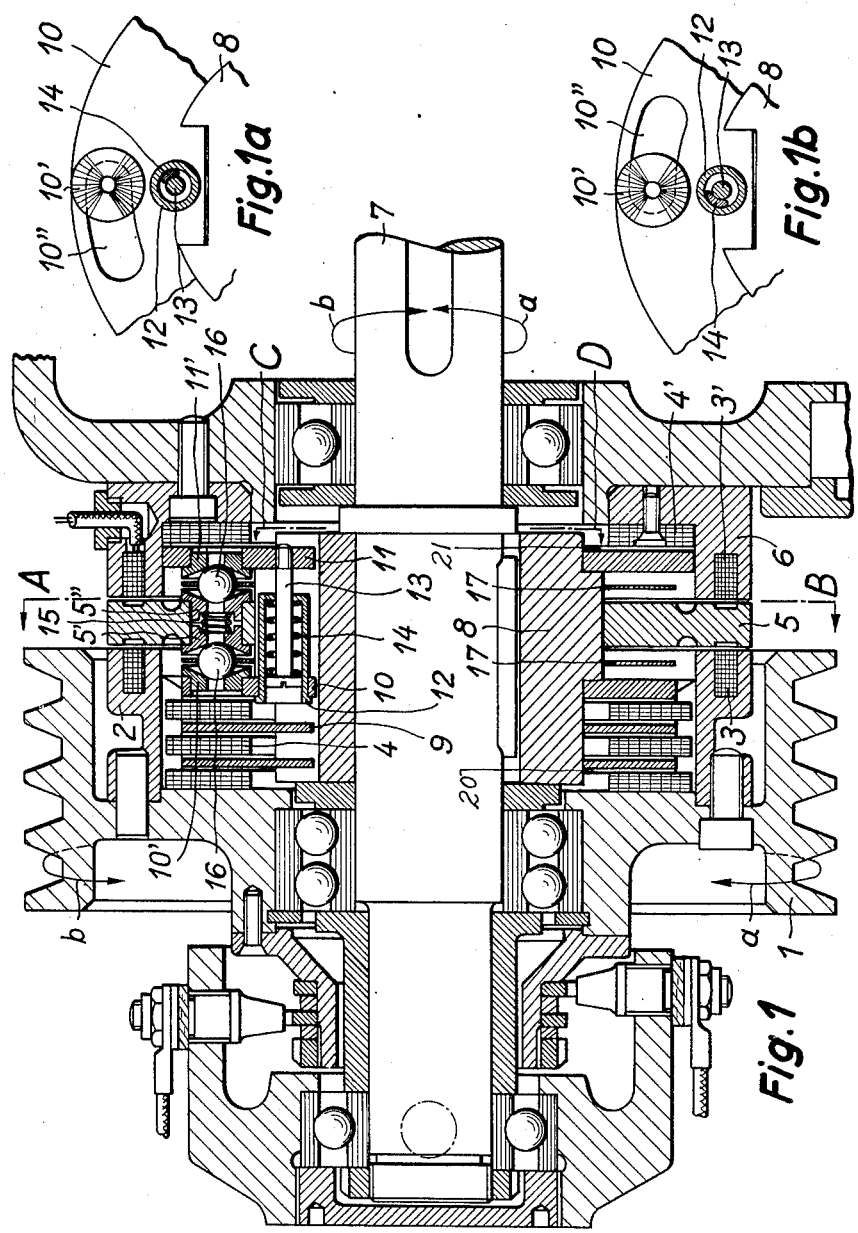
Figure 1 shows a longitudinal section through a dry double coupling, both couplings being out of engagement.
Figure 2:
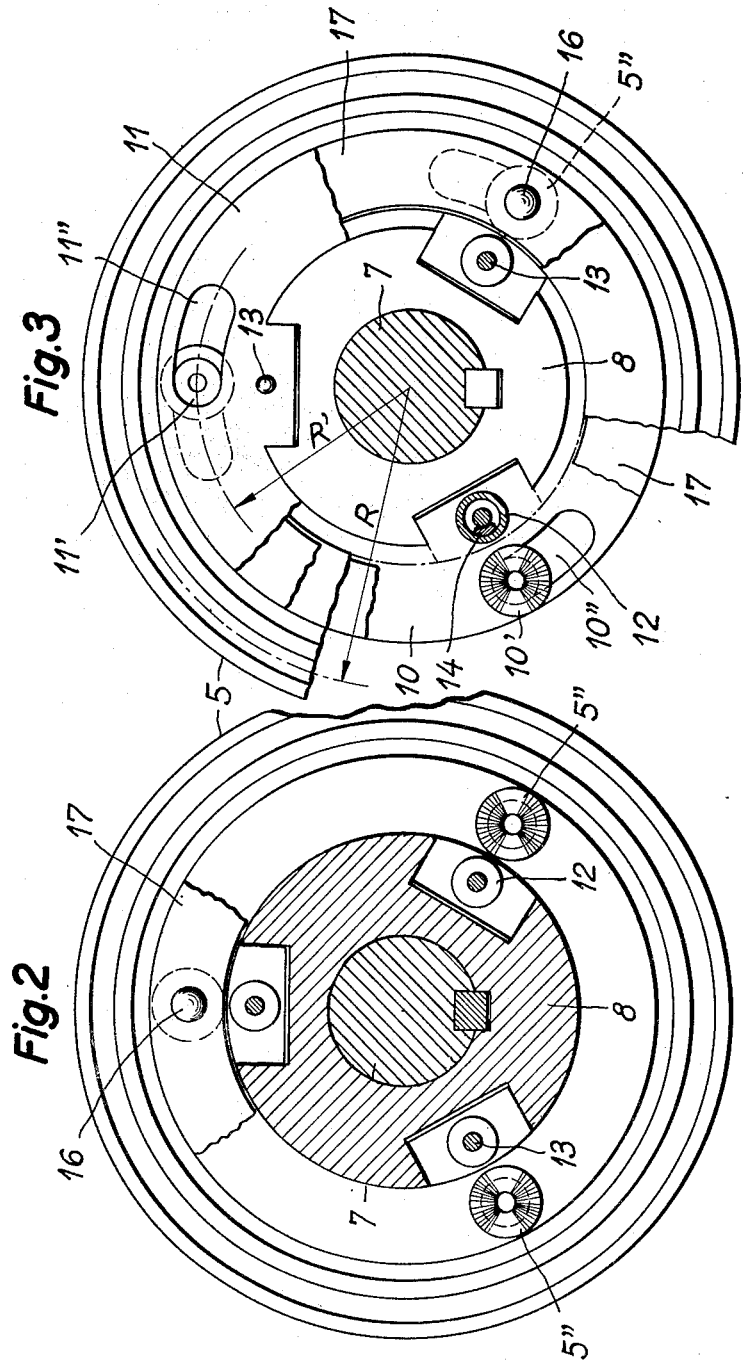
Figure 2 is a section along line A—B of Figure 1.

In the embodiment of the double coupling according to Figure 1, the inner coupling discs 9 are made of hardened steel and the outer coupling discs 4 and 4' of pressed material having a high coefficient of friction. That coupling of the double coupling which is on the left of Fig. 1, is a driving coupling with five friction surfaces 20 of the main coupling, whilst the right-hand coupling of the double coupling is a braking coupling with one friction surface 21 of the main coupling. The left-hand and the right-hand coupling have a preliminary coupling action with a common engaging and disengaging member, the armature means 5.

One half of the left-hand coupling consists of the driving body 1 with the magnet body 2 supporting the energising coil 3 and the coupling discs 4. The driving body 1 is also provided with the slip rings with an interposed insulating layer. The other half of the left-hand coupling consists of the inner coupling discs 9, the pressure body 10 for the friction discs, the body 8 which is common to the left-hand and right-hand coupling and is keyed on the driven shaft 7. The coupling discs 9 and the pressure body 10 are mounted on the body 8 so as not to turn on it, but to be axially displaceable; of the engaging and disengaging body 5 which is common to the left-hand and right-hand coupling and is formed as armature for the left-hand and right-hand coupling. The body 5 is supported on the body 8 so as to turn freely and to be capable of moving in the axial direction. The armature means 5 is disposed between the pressure bodies 10 and 11 and is in connection with them by means of balls 16 which lie in the conical recesses of the pressure body means 10 and 11 and of the armature 5. The armature is preferably held between the pressure bodies so that, when the couplings are out of engagement, it does not come in contact with any magnetic body and, on the energizing current being switched off, causes the balls to roll back into their conical recesses and also causes both actuating bodies, the pressure body and the armature, to return into their initial position and to be held in this initial position in such a manner that no relative motion can take place between the actuating bodies until the next switching-on operation. This is preferably achieved by a socket 12, a screw 13 and a spring 14, which means are arranged for instance at an angular distance of 120°.

The pressure body 10 may support the sockets 12 and the pressure body 11 the screws 13 or vice versa, springs 14 being arranged between the sockets 12 and the screws 13. The pressure bodies 10 and 11, have slots 10" and 11" to be used for both directions of rotation. The slots 10" and 11" have the mean radius R' which is smaller than the mean radius R of the preliminary coupling; into these slots 10" and 11" are inserted the insertions 10' and 11' (see Figure 3). The slots with insertions of the pressure bodies may for instance again be spaced at an angular distance of 120°. According to the direction of rotation of the coupling the pressure body is inserted in the double coupling with one side or the other facing the armature, the insertions being inserted in the slots on that side which faces the armature (see Figures 1a and 1b). On the same radius R' the same number of insertions 5' is arranged on the left side and insertions 5" on the right side of armature 5, there being inserted in each bore of the armature an insertion 5' and an insertion 5" which are thus disposed opposite one another in the armature 5.

One half of the right-hand coupling consists of the stationary magnet body 6 with the energizing coil 3' and a stationary friction disc 4' and the other half of the pressure body 11 with the insertions 11' in the slots 11", the armature 5 being common to both couplings, in which the pressure body 11 is arranged non-rotatable, but axially displaceable.

In order to avoid a centrifugal motion of the ascending balls which lie in the conical recesses, the balls 16 of each coupling are guided by means of a cage 17.

The described double coupling (Figure 1) operates as follows: The driving body 1 of the left-hand coupling is the driving part having, for instance, the direction of rotation a. Current for the left-hand coupling is switched on, the current-supply brushes which are mounted in a stationary body conduct the current to the annular coil 3. As this coil is embedded in the magnet iron body 2, a magnetic field is at once formed, causing the armature 5 which is separated from the magnet body 2 only by a very narrow air gap to be attracted by the driving magnet body and to be carried around by the frictional force of the latter. The pressure bodies 10 and 11 for the friction surfaces lag behind, so that the armature 5 turns with respect to the pressure bodies 10 and 11. Due to the rotary motion of the armature with respect to the pressure bodies 10 and 11, produced by the preliminary coupling, the balls 16 of the left-hand coupling roll up in the conical insertions, as the insertions 10' have been brought to bear in the pressure body 10, while the insertions 11' of the pressure body 11 remain freely movable so they are not brought to bear and the balls 16 of the right-hand coupling cannot roll up. The pressure body 10 is forced by a wedging action to travel along an axial path, which results in the engagement of the coupling discs so that the friction surfaces are pressed against one another.

The shaft 7 is coupled with the driving body 1. The exerted application pressure on the coupling discs is maintained as long as the electromagnet is supplied with current. On the energizing current being switched off, the armature 5 becomes uncoupled from the magnet body 2, the preliminary coupling is released, the balls 16 roll back into the conical recesses of the insertions, the pressure body 10 and the armature 5 are forced by the pressure exerted by the springs 14 on the pressure bodies 10 and 11 to return into their initial position, whereby the coupling discs are released and the friction surfaces are disconnected. The driven shaft is disconnected from the drive.

At the termination of the operation of the driving coupling the braking coupling is put into operation as the energising current is supplied to the annular coil 3' which is embedded in the stationary magnet body 6. The rotating armature 5 is attracted by the stationary magnet body 6, is coupled with it—preliminary coupling—and is braked by the frictional force of the latter until it comes to rest. The pressure bodies 10 and 11 continue to rotate, causing a relative rotary motion to take place again between the armature 5 and the pressure bodies 10 and 11. The insertions 10' of the pressure body 10 remain freely movable with respect to the pressure bodies during this rotation of the armature 5, whilst the insertions 11' of the pressure body 11 are brought to bear, whereby the balls 16 of the braking coupling roll up and force the pressure body 11 to travel axially, being pressed by a wedging action against the stationary friction disc 4', so that, after a very short period of sliding of the friction surfaces of the main coupling, the driven shaft 7 comes to rest. The braking coupling may also have a plurality of friction surfaces of the main coupling, so as to enable the driven shaft 7 to be stopped immediately, even in the case of considerable gyratory moments. Between the insertions, with which the armature is provided on both sides and which are positioned opposite one another, springs 15 are arranged so that a pressure is always exerted on the balls 16, even when the other coupling is in operation. The free path which the insertions might travel in the slots of the pressure bodies is greater than the path covered by the armature with the insertions for putting the coupling into engagement. If the direction of rotation of the driving body 1 is in the sense of b., then the pressure bodies 10 and 11 will be inserted in the double coupling with their other side facing the armature 5, the sides facing the armature again having the insertions. The axial pressure of the pressure body for the friction surfaces of a driving coupling required for transmitting the necessary torque, or the force of the pressure body for the friction surfaces of the braking coupling required for bringing a gyratory moment to rest, is obtained from the frictional force between electromagnet and armature, taking into account the ratio of the radii R and R' (Figure 3) and the wedging effect produced by the rolling up of the balls 16 in the conical recesses of the insertions. The wedging effect of a coupling may be selected at will by the selection of the conical angle of the insertions.

Figure 3:
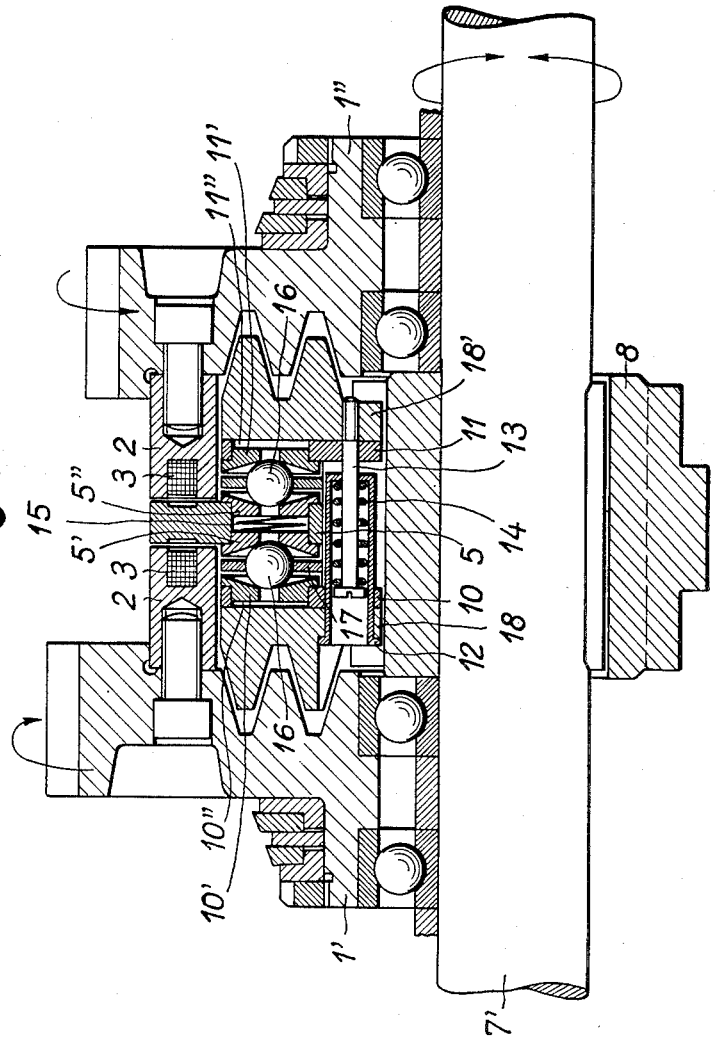
Figure 3 is a section along line C—D of Figure 1.

Figure 3 shows how the pressure bodies with their slots and insertions are inserted in the double coupling, when the driving body 1 of Figure 1 drives with the direction of rotation a.

Figure 4:
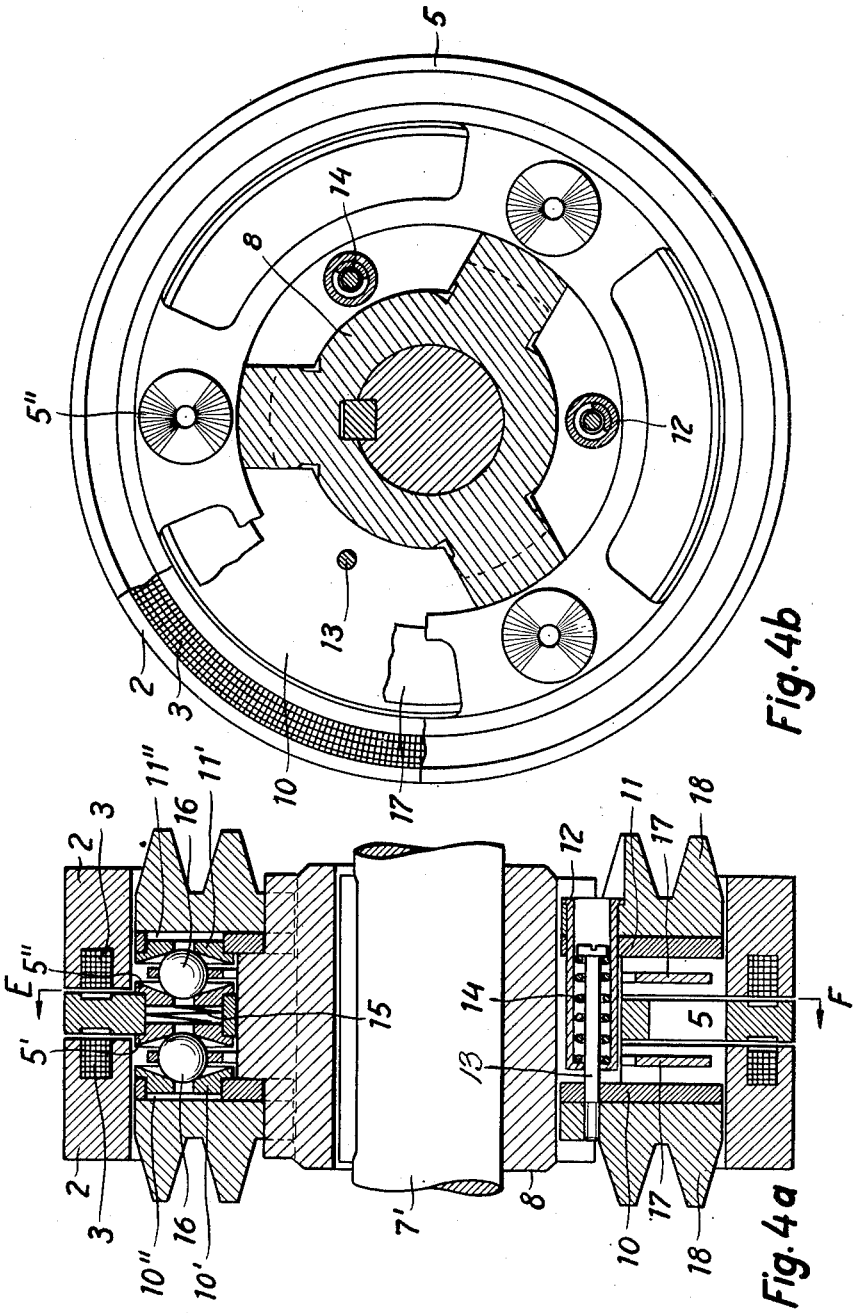
Figure 4 shows half of a longitudinal section through a double coupling in an oil bath, the couplings being out of engagement.

In the embodiment example of the double coupling according to Figure 4 the left-hand and right-hand coupling are driving couplings, having opposite direction of rotation, for instance for forward and backward running of machine tools or for marine propulsions for travelling ahead and astern and so forth. These driving couplings make it possible to effect with the simplest manipulation and within the shortest possible time a change-over from coupling to coupling, and a reversal of the direction of rotation of the shaft 7' as often and rapidly as required. In this embodiment bodies 1' and 1'' are the driving bodies of the couplings and are toothed wheels. When one coupling or the other is actuated, the pressure body 10 or 11 causes a body 18, or 18', to engage, which latter bodies just as the pressure bodies engage in the body 8 so as to turn with it, are pressed against the inner walls of the driving bodies, the toothed wheels 1' or 1''. In order to be able to transmit considerable torques with this double coupling in the oil bath, the bodies 18 and 18' and the driving bodies 1' and 1'' are provided with wedge-shaped grooves which increase the frictional resistance. The pressing of the bodies 18 or 18' against the driving bodies 1' or 1'' by the pressure body 10 or 11 in the direction of the shaft axis produces no axial pressure on the driving bodies 1' or 1'', on the ball bearings, on the body 8 or on the driven shaft 7'. The double coupling also provides a great advantage, owing to the fact that it adjusts itself, when the friction surfaces become worn, by the turning of the armature with its insertions in relation to the pressure bodies with their insertions, which is produced by the preliminary coupling, continues so long that in each case, on a smaller or greater turning motion of the armature with respect to the pressure bodies taking place, the balls can run up sufficiently in the conical recesses of the insertions until, in the case of driving couplings, the two coupling halves synchronise or, in the case of braking couplings, the two halves have come to rest, but the pressure exerted on the frictional surfaces remains the same. Should the couplings become overloaded, the frictional surfaces of the main coupling and the frictional surfaces of the preliminary coupling will slip, as an increase in the torque will not cause an increase in the force pressing the electromagnet against the armature, so that the couplings also function as safety couplings and thus eliminate the danger of fractures of toothed wheels and costly repairs on machines and the like.

Figure 5:
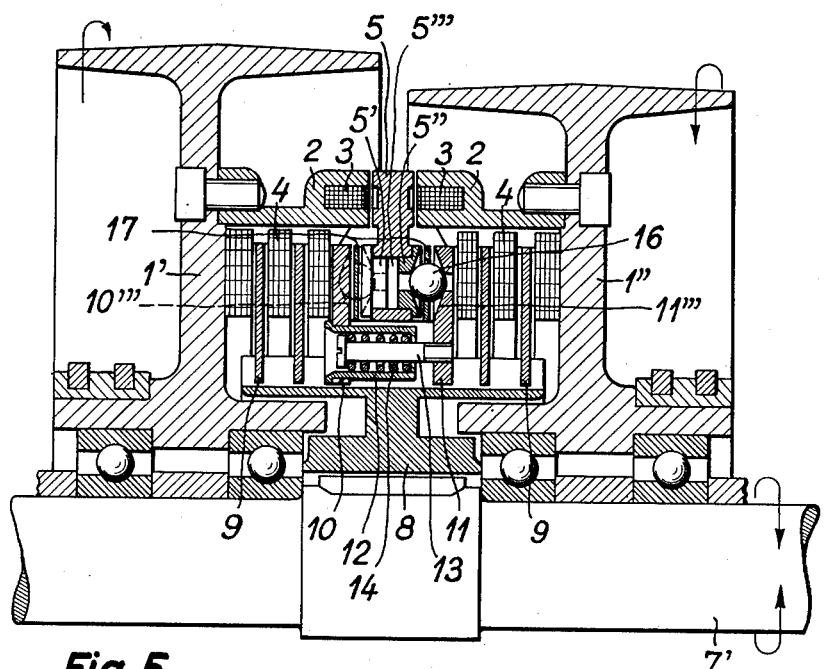
Figure 5 shows a longitudinal section through a dry double coupling, the left-hand and the right-hand couplings being out of engagement.
Figure 6:
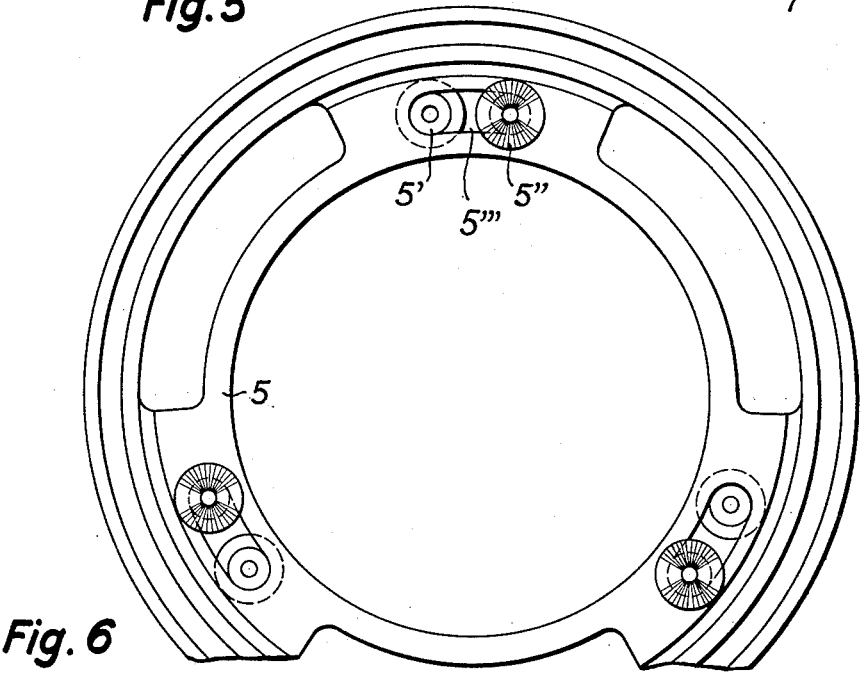
Figure 6 shows in elevation the common armature of the double coupling of Figure 5.

Fig. 4a shows a further constructional example according to Figure 4. The means 12, 13 and 14, with which the pressure bodies 10 and 11 are provided and which cause either the body 18 and 18' with the pressure body 10 or 11 and the armature 5 to return into the initial position and thereby release the friction surfaces of the coupling, are staggered with respect to the insertions, with which the double coupling is provided. In this embodiment the bodies 10 and 11, 18 and 18' engage with internal recesses in the body 8. In Fig. 4b, which is a section along line E—F of Figure 4a, a portion of the armature is broken away, also a portion of the left-hand cage 17 for the balls 16. Figure 5 shows a dry double coupling, the left-hand and the right-hand coupling being driving couplings. The driving bodies 1' and 1'' are belt pulleys, but may also be V-belt pulleys, toothed wheels and so forth. The driven shaft 7' can be driven according to whether one or other coupling is put into engagement or from coupling to coupling, in either direction of rotation. The pressure bodies 10 and 11 have conical recesses 10''' and 11'''. The armature 5 is common to both couplings and has the slots 5''', in which are inserted on the left-hand side the insertions 5', and on the right-hand side the insertions 5''. This double coupling functions in the following manner. On actuation the left-hand coupling, for instance, the magnet body 2 carries the armature 5 a round with it in the direction of rotation of the driving body 1', and the insertions 5' cause the balls 16 of the left-hand coupling to roll up, whereby the pressure body 10 presses the friction surfaces against one another and the coupling is thereby thrown in, while the insertions 5'' of the armature remain freely movable in this direction of rotation of the armature and do not come into action, the balls 16 of the right-hand coupling remaining in their conical recesses. Upon actuation of right-hand coupling, the driving body 1'' carries the armature round with it in its direction of rotation, the insertions 5'' come to bear and cause the balls 16 of the right-hand coupling to roll up, whereby the pressure body 11 presses the friction surfaces against one another, the right-hand coupling engages, the insertions 5' remain freely movable with the armature rotating in this direction, while the balls 16 of the left-hand coupling remain in their ball-shaped recesses.

A great advantage of this double coupling is, that, on one coupling being let in, the application pressure of the pressure body for the friction surfaces of the main coupling is greatest, and therefore has the maximum value when there is a great differential turning motion between the frictional surfaces, while eliminating the shock which occurs when the friction surfaces pass from sliding to the stationary friction after the pressing together of the friction surfaces of the main coupling by the pressure body. The pressure body shows a smaller value of the application pressure for the friction surfaces, as the pressure of the pressure body on the friction surfaces is directed in opposition to the attractive power of the electro-magnet, whereby the frictional force of the preliminary coupling becomes smaller, which results in a smaller application pressure of the pressure body for the friction surfaces.

It should be noted that when one changed coupling is maintained the other coupling should not be influenced which may be attained by providing in each one of the two pressure bodies conical recesses, like in the pressure bodies 10 and 11 in Figure 5, and by providing the common armature on both sides of the insertions with conical recesses, whereby in each bore there is an insertion 5' on the left-hand side and an insertion 5'' on the right-hand side, as in the armature of Figures 1 and 4. The pressure bodies are so disposed on the transmission body that they do not abut against it during rotation in one direction, the pressure body of the left-hand coupling remaining freely movable in the direction of rotation of the right-hand coupling and the pressure body of the right-hand coupling remaining freely movable in the direction of rotation of the left-hand coupling.

What I claim is:

1. In an electro-magnetically actuated mechanical double friction coupling, in which those couplings can be selectively put into and out of operation, two electro-magnets, friction surfaces, pressure body means composed of two pressure bodies acting on said friction surfaces, a single armature means lying between said two pressure bodies, and having only limited rotation with respect thereto, insertions movably mounted in one of said means, and having only limited rotation with respect thereto, conical recesses being formed in said insertions and in the other of said means, balls lying in said recesses and connecting said armature means with said two pressure bodies, and compression springs operably connected with said pressure bodies for disengaging them from the friction surfaces, so that, when one coupling is out of operation, the produced frictional force between magnet and armature means constitutes a preliminary coupling causing the movably arranged conical recesses to turn relatively to each other, whereby said balls will roll up in the conical recesses and the pressure body press the friction surfaces of this coupling against one another with a wedging effect, while the conical recesses with the interposed balls of the other coupling remain mobile and do not come to bear, so that the balls cannot roll up and the pressure body of this coupling does not press the friction surfaces.

2. In an electro-magnetically actuated double friction coupling as claimed in claim 1, spring means common to both couplings for releasing the friction surfaces of one coupling after said coupling has been put out of operation.

3. In an electro-magnetically actuated double friction coupling as claimed in claim 1, the feature that the conical recesses of the pressure bodies and of the armature are arranged on a smaller radius than the mean radius of the preliminary coupling.

4. In an electro-magnetically actuated double friction coupling as claimed in claim 1, friction surfaces with grooves having a wedge-shaped cross section.

5. In an electro-magnetically actuated double friction coupling as claimed in claim 1, a cage for guiding the balls.

6. In an electro-magnetically actuated double friction coupling as claimed in claim 1, a body common to both couplings and carrying the pressure bodies, the armature common to both couplings and the inner coupling bodies.

7. In an electro-magnetically actuated double friction coupling as claimed in claim 1, the feature that the armature lies between two electro-magnets rotating in opposite direction.

8. In an electro-magnetically actuated double friction coupling as claimed in claim 1, insertions with said conical recesses movably mounted on both sides of said armature, and immovable conical recesses in said pressure bodies.

9. In an electro-magnetically actuated double friction coupling as claimed in claim 1, slots provided in the armature and insertions provided with said conical recesses disposed movably in said slots, on both sides of the armature.

ALBERT DOEBELI.

References Cited in the file of this patent

UNITED STATES PATENTS

| Number | Name | Date |
| --- | --- | --- |
| 2,500,814 | Gatiss | Mar. 14, 1950 |

FOREIGN PATENTS

| Number | Country | Date |
| --- | --- | --- |
| 599,462 | Great Britain | Mar. 12, 1948 |